No. 753,588. PATENTED MAR. 1, 1904.
D. KUNKLE.
WASHER.
APPLICATION FILED APR. 10, 1902. RENEWED FEB. 3, 1904.
NO MODEL.
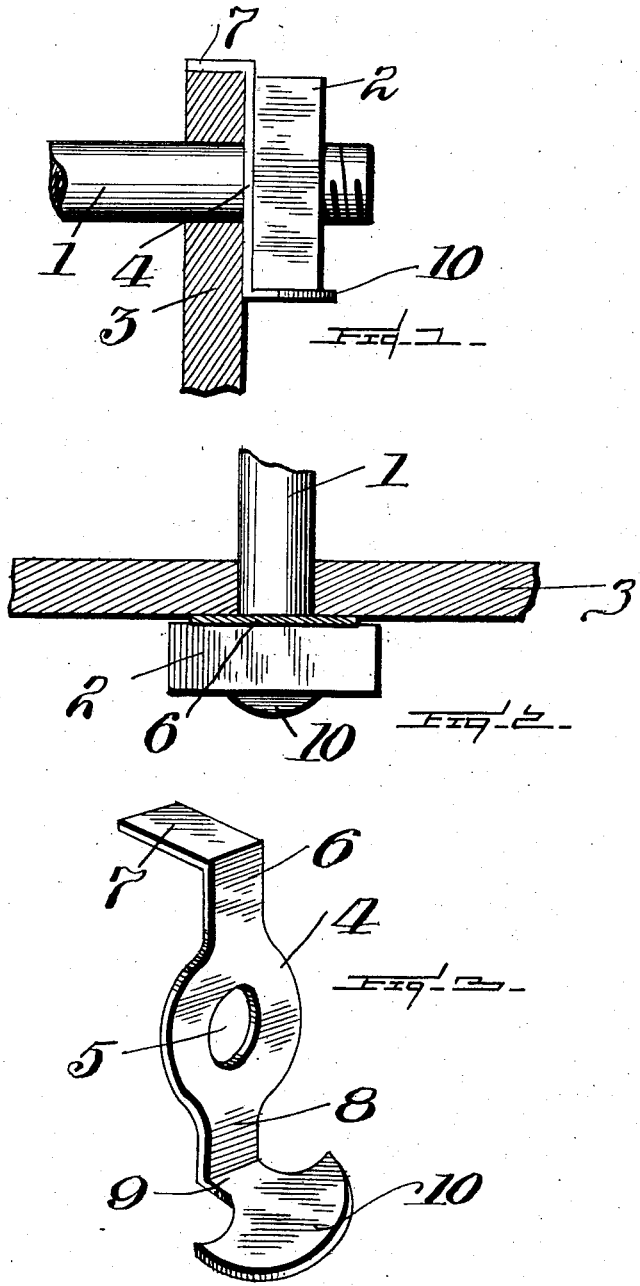
Witnesses:
Inventor:
Daniel Kunkle,
By
Attorneys.

No. 753,588. Patented March 1, 1904.

UNITED STATES PATENT OFFICE.

DANIEL KUNKLE, OF GREENSBURG, PENNSYLVANIA.

WASHER.

SPECIFICATION forming part of Letters Patent No. 753,588, dated March 1, 1904.

Application filed April 10, 1902. Renewed February 3, 1904. Serial No. 191,895. (No model.)

*To all whom it may concern:*

Be it known that I, DANIEL KUNKLE, a citizen of the United States of America, residing at Greensburg, in the county of Westmoreland and State of Pennsylvania, have invented certain new and useful Improvements in Washers, of which the following is a specification, reference being had therein to the accompanying drawings.

This invention relates to certain new and useful improvements in washers, and relates more particularly to that class of washers employed to lock nuts upon bolts.

My invention has for its object to provide a washer that will effectually lock the nut to the bolt to prevent the same from turning or jarring loose; furthermore, to provide a washer that may be used in connection with any style of bolt or nut.

My invention further contemplates to provide a washer that will be extremely simple in construction, strong, durable, comparatively inexpensive to manufacture, and highly efficient in its use.

With the above and other objects in view the invention consists in the novel construction, combination, and arrangement of parts to be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1 is a side elevation of a nut and bolt having my improved washer secured thereto. Fig. 2 is a longitudinal sectional view. Fig. 3 is a perspective view of the washer.

In the drawings the reference-numeral 1 represents a screw-threaded bolt carrying a nut 2, and 3 represents the piece of material through which the bolt passes.

The washer comprises a circular body portion 4, having a central opening 5 formed therein, through which the bolt extends, said rounded head portion carrying an upper extension 6, which is bent over at right angles, as shown at 7, and engages the upper face of the material 3. The lower portion of the head 4 carries a downward extension 8, which is bent at right angles, as shown at 9, and carries an enlarged lip 10, the latter extending slightly beyond the nut 2 in order that when it is desired to remove the nut the latter may be easily forced downwardly, permitting the nut to turn. The enlarged lip 10 is connected to the lower extension 8 by means of a contracted neck of the same width as the extreme lower portion of the extension 8, the ears or extensions formed by this lip 10 extending beyond the sides of the neck, as is clearly shown in Fig. 3 of the drawings. It will be seen that when the lip and portion 7 are turned over in the opposite directions the lip engaging the under face of the nut will prevent the nut from turning in either direction and will retain the same in a firm manner, preventing it from jarring loose. It will also be noted that by reason of the enlarged lip a better purchase is obtained upon the under face of the nut, thereby preventing the same from turning.

The many advantages obtained by the use of my improved washer will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

A device of the type set forth comprising a washer having a substantially circular body having an aperture therein, oppositely-arranged extended portions formed integral with said body portion and extending in the same plane therewith, one of the said extended portions having a greater length than the other, and provided with an outwardly-extended portion formed at right angles with the same, the other of the said extended portions provided with a portion extended at right angles thereto, and an enlarged substantially semicircular portion formed integral with said last-named portion, said enlarged portion lying in the same plane with the angular extension from said body portion, and having portions thereof extending from both sides of said portion, substantially as described.

In testimony whereof I affix my signature in the presence of two witnesses.

DANIEL KUNKLE.

Witnesses:
    JOHN NOLAND,
    E. E. POTTER.